United States Patent
Morgan et al.

(10) Patent No.: US 11,685,661 B2
(45) Date of Patent: Jun. 27, 2023

(54) CARBON FOAM BASED SILICON CARBIDE

(71) Applicant: Touchstone Research Laboratory, Ltd., Triadelphia, WV (US)

(72) Inventors: Dwayne R. Morgan, Wheeling, WV (US); Frederick H. Wade, Wellsburg, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 425 days.

(21) Appl. No.: 16/946,324

(22) Filed: Jun. 17, 2020

(65) Prior Publication Data

US 2021/0395095 A1 Dec. 23, 2021

(51) Int. Cl.
*C01B 32/977* (2017.01)

(52) U.S. Cl.
CPC .................................. *C01B 32/977* (2017.08)

(58) Field of Classification Search
None
See application file for complete search history.

(56) References Cited

U.S. PATENT DOCUMENTS

| | | | | |
|---|---|---|---|---|
| 4,702,900 A * | 10/1987 | Kurachi | ................. | C01B 32/97 423/439 |
| 5,462,800 A * | 10/1995 | Yamazaki | ............. | C04B 41/009 423/447.5 |
| 5,877,104 A * | 3/1999 | Bryson | ................. | C04B 35/571 528/33 |
| 6,087,024 A * | 7/2000 | Whinnery | ............. | C04B 38/062 264/44 |
| 6,656,239 B1 * | 12/2003 | Rogers | ................... | C04B 28/02 44/628 |
| 6,749,652 B1 * | 6/2004 | Rogers | ..................... | B32B 5/16 264/29.7 |
| 6,814,765 B1 * | 11/2004 | Rogers | ..................... | B32B 5/18 264/29.7 |
| 10,954,167 B1 * | 3/2021 | Garnier | ................. | C01B 32/956 |
| 11,186,522 B1 * | 11/2021 | Morgan | ................ | C04B 35/571 |
| 2003/0072704 A1 * | 4/2003 | Konno | .................. | C01B 32/956 423/345 |
| 2011/0135558 A1 * | 6/2011 | Ma | ........................ | C04B 35/565 423/345 |
| 2016/0137512 A1 * | 5/2016 | Hase | ..................... | C01B 32/956 423/345 |
| 2016/0137513 A1 * | 5/2016 | Hase | ..................... | C01B 32/956 428/402 |
| 2019/0292441 A1 * | 9/2019 | Hill | ........................ | C04B 38/009 |
| 2020/0115232 A1 * | 4/2020 | Olson, III | ............... | C01B 32/05 |
| 2020/0115285 A1 * | 4/2020 | Olson, III | ........... | C04B 38/0022 |
| 2021/0296652 A1 * | 9/2021 | Easter | ............... | C04B 35/62204 |

FOREIGN PATENT DOCUMENTS

| | | | | | |
|---|---|---|---|---|---|
| JP | 03193617 A | * | 8/1991 | ............. | C01B 31/36 |
| JP | 2006097009 A | * | 4/2006 | ............... | C09C 1/56 |

OTHER PUBLICATIONS

Machine translation of JP-319617, translation generated Aug. 2022, 2 pages. (Year: 2022).*

* cited by examiner

*Primary Examiner* — Robert S Loewe
(74) *Attorney, Agent, or Firm* — Philip D. Lane

(57) ABSTRACT

A method for producing a siliconized carbon foam with regions of silicon carbide directly from comminuted coal and particulate silicone resin precursor is described. The process includes blending a comminuted coal and particulate silicone resin and heating the blended mixture to form a siliconized carbon foam and then further heating to form regions of silicon carbide.

4 Claims, No Drawings

CARBON FOAM BASED SILICON CARBIDE

FIELD OF THE INVENTION

The present invention is directed to forming silicon carbide using coal and a silicone precursor.

SUMMARY OF THE INVENTION

The present invention is directed to producing a siliconized carbon foam by blending a predetermined amount of comminuted coal and a predetermined amount of a particulate silicone resin precursor. Heating the blended mixture above the melting point of the particulate silicon precursor to coat and infiltrate the comminuted coal particles and optionally allowing the blended mixture to cool. Heating the blended mixture is continued under controlled temperature and optionally under controlled pressure, at a temperature and for a time sufficient for the comminuted coal to form a carbon foam followed by continued heating to a temperature of at least about 1000 C for a time sufficient for at least a portion of the silicone resin precursor to react with carbon to form a siliconized carbon foam. In some embodiments, the particulate silicone resin precursor is a polysiloxane resin.

In some embodiments, the invention may include a method wherein the polysiloxane resin comprises repeating units having the formula $[-Si(R)_2-O-]_n$, wherein R may be one or more selected from the group consisting of, hydrogen methyl, ethyl, propyl, isopropyl, butyl, isobutyl, or t-butyl, and wherein n ranges from about 10 to about 100.

DETAILED DESCRIPTION OF EMBODIMENTS OF THE INVENTION

Some preferred embodiments of the present invention are described in this section in detail sufficient for one skilled in the art to practice the present invention without undue experimentation. It is to be understood, however, that the fact that a limited number of preferred embodiments are described in this section does not in any way limit the scope of the present invention as set forth in the claims.

It is to be understood that whenever a range of values is described herein, i.e. whether in this section or any other part of this patent document, that the range includes the end points and every point therebetween as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention.

The present invention is directed to producing a siliconized carbon foam through the direct foaming of a comminuted coal blended with a particulate silicone resin precursor. As used herein, "siliconized carbon foam" refers to a porous carbon based material in which at least a portion of the porous carbon based material has formed silicon carbide from the reaction of the silicone resin precursor with carbon from the coal precursor forming the porous foam. In general, the process involves blending a desired amount of comminuted coal with a desired amount particulate silicone resin precursor, heating the blended coal and silicone resin precursor under conditions to cause the comminuted coal to swell and form a foam or porous material and form a siliconized carbon foam, followed by continued heating to a temperature sufficient for silicon, from the silicone resin precursor, to react with carbon in the coal precursor to produce silicon carbide in at least a portion of the siliconized carbon foam.

The comminuted coal starting material includes a coal that swells to some degree upon heating. In some embodiments, the swelling coal is an agglomerating coal exhibiting a Free Swell Index as determined by ASTM D720 greater than about 0.5 and in some embodiments, between about 3.5 and about 5.0, and in additional embodiments between about 3.75 and 4.5. Suitable swelling coals may include, but are not limited to, Low Volatile, Medium Volatile, High Volatile A, High Volatile B, and High Volatile C bituminous coals exhibit the above coking or Free Swell Index properties.

The size of the coal particles in the comminuted coal is not particularly limited. In some embodiments, the size of particles in the comminuted coal source may range from about 0.020 mm (or less) to about 0.5 mm. In certain embodiments, the coal is comminuted to a size such that essentially all of the coal will pass through an 80 mesh screen (U.S. Standard Sieve Series). Such 80 mesh screens have openings of about 0.18 mm. In other embodiments, the coal is comminuted to a size such that essentially all of the coal will pass through a 140 mesh screen (U.S. Standard Sieve Series). Such 140 mesh screens have openings of about 0.105 mm. In still other embodiments, suitable coals comminuted to other mesh sizes may be utilized. In various embodiments, the coal may be comminuted to sizes below about 0.42 mm, in other embodiments below about 0.18 mm, and in yet other embodiments below about 0.105 mm. In some embodiments, coals comminuted to larger particle size distributions will provide carbon foams having larger cell sizes. In other embodiments, coals comminuted to smaller particle size distributions will provide carbon foams having smaller cell sizes.

In the present process, the siliconized carbon foam is formed in situ in the presence of the silicone resin precursor. The following information relates to the properties of the carbon foam structure, excluding any silicon in an embodiment of the invention. As this method creates the carbon foam in the presence of the silicon precursor, the physical characteristic of the combined material will vary from that of carbon foam alone. Carbon foam is typically a strong, open cell, durable, stable, easily machined, and relatively unreactive lightweight material. Carbon foams are carbonaceous materials of very high carbon content that have appreciable void volume. As such, carbon foams are primarily comprised of (elemental) carbon. In appearance, excepting color, carbon foams resemble readily available commercial plastic foams. The void volume of carbon foams is located within numerous empty cells. The boundaries of these cells are defined by the carbon structure. These cells typically approximate ovoids of regular, but not necessarily uniform, size, shape, distribution, and orientation. The void volumes in these cells may directly connect to neighboring void volumes. Such an arrangement is referred to as an open-cell foam. The carbon in these foams forms a structure that is continuous in three dimensions across the material. Typically, the cells in carbon foams are of a size that is readily visible to the unaided human eye. Also, the void volume of carbon foams is such that it typically occupies much greater than one-half of the carbon foam volume. The density of carbon foams typically is less than about 1 g/cc and generally less than about 0.8 g/cc. In some embodiments, the density for carbon foam may range from about 0.05 g/cc to about 0.8 g/cc. In some embodiments, carbon foams may exhibit compressive strengths ranging up to about 10,000 psi. In other embodiments, the compressive strength for carbon foam may range from about 100 psi to about 10,000 psi. In certain other embodiments, compressive strengths for carbon foam may range from about 400 psi to about 7,000 psi. The carbon foam may be carbonized carbon foam. Alternatively, if desired, the carbon foam may be graphitized carbon foam.

The above comminuted coal is blended with a particulate silicone resin precursor. Preferably, the silicone resin precursor may be any silicon containing compounds that can provide elemental silicon that reacts with carbon from the coal at elevated temperatures such as 1000 C that is a solid or particulate at room temperature. A preferred silicone resin precursor includes, a polysiloxane silicon-based compound. As used herein "polysiloxane" is a chemical compound having branched or unbranched backbones consisting of repeating siloxane units [—Si(R)$_2$—O—]$_n$ with side chains R attached to the silicon atoms, where R may be hydrogen or a C1 to about C4 hydrocarbon group, including but not limited to a methyl, ethyl, propyl, isopropyl, butyl, isobutyl, or t-butyl group. Preferably, the polysiloxane ranges from about 10 to about 100 repeating siloxane units. In preferred embodiments, at least 50% of the repeating siloxane units are dimethyl siloxane units. In other embodiments dimethyl siloxane may range from about 20% to 100% of the siloxane repeating units.

The size of the particulate silicone resin precursor is not particularly limited. In certain embodiments the size of the particulate silicone resin precursor may be similarly sized with the particle sizes of the comminuted coal. In some embodiments, the size of the particulate silicone resin precursor may range from about 0.010 mm to about 0.5 mm. The size of the particulate silicone resin precursor may be larger than the size of the comminuted coal particles, or in alternative embodiments, the size of the particulate silicone resin precursor may be smaller than the size of the comminuted coal particles.

The relative amount or ratio of comminuted coal to particulate silicone resin precursor is not particularly limited and may vary depending on the desired properties for the silicon carbide carbon foam. In some embodiments, the available carbon in the comminuted coal and elemental silicon from the particulate silicone resin precursor are provided in stoichiometric amounts or in a 1:1 molar ratio. If desired, that amount of particulate silicone resin precursor may be provided in less than a 1:1 molar ratio. In still further embodiments, the particulate silicone resing precursor may be provided in excess of the available carbon. In some embodiments, the particulate silicone resing precursor may be provided in an amount ranging from about 0.1 to about 10 times the amount of silicon to available carbon in the comminuted coal. When the particulate silicone resing precursor is provided in stoichiometric excess, the excess silicon remains with the final siliconized carbon foam product forming a composite carbon foam—silicon carbide—silicon composite.

The desired or predetermined amounts of comminuted coal and particulate silicone resin precursor are blended together to form a bended mixture. In certain embodiments, the comminuted coal and particulate silicone resin precursor are blended to form a homogeneous blend of particles. The blended mixture is loaded into a mold or pan for further processing. The size and shape of the mold or pan is not particularly limited. In some embodiment the mold may have a near net shape, close to the desired final shape of the product.

The method includes a siliconized carbon foam forming step followed by a silicon carbon reaction step the leads to monolithic bulk silicon carbide foam. Advantageously, no additional materials are needed once the carbon foam forming step is started and the entire process to form carbon foam silicon carbide occurs in a simple and direct method.

The foam forming step is the result of swell induced via comminuted coal thus producing a siliconized carbon foam. The foam forming step is preferably conducted under atmospheric pressure. Alternatively controlled pressure may be used, similar to that for forming carbon foams from coal under controlled heating and pressure, preferably under an inert atmosphere known to those skilled in the art. Some of these methods include producing carbon foams directly from particulate coal. For example, U.S. Pat. Nos. 6,749,652 and 6,814,765, each herein incorporated by reference in their entirety, describe methods for producing carbon foam directly from particulate coal and are suitable for use in conjunction with the present invention.

A suitable swelling coal, such as bituminous coal, is heated at a controlled, predetermined rate, in an essentially closed vessel. The particulate coal is placed in a mold and is heated in an inert atmosphere under process atmospheric pressures typically greater than ambient pressure and can reach pressures of about 500 psi or greater. The particulate coal is heated to temperatures sufficient to cause the coal to become plastic and swell, forming a carbon foam. In many instances heating the particulate coal to a temperature between about 300° C. and about 500° C. is sufficient to form a carbon foam material from the blended mixture. The temperatures and pressure conditions will vary depending upon the characteristics of the particulate coal and the blended mixture. In some embodiments, the final elevated temperature for the carbon foam forming step may need to be held for a period of time to allow the carbon foam to form. This hold time may vary depending on the coal and the blended mixture but may typically range from about 15 minutes to 5 hours or more. Optionally, the foam may be cooled if desired before proceeding to the silicon carbide forming step.

Once the foam forming step has been completed, the mold with the now formed siliconized carbon foam, i.e. coal and particulate silicone resin precursors, undergo a transformation reaction to form silicon carbide. The silicon carbide forming step includes heating the mold to a temperature sufficient for the particulate silicone, and in a preferred embodiment, polysiloxane resin, to react with carbon in coal to form silicon carbide in at least a portion of the siliconized carbon foam. This heating step is preferably performed in an inert atmosphere such as helium or argon. In some embodiments, the mold is heated to a temperature from about 1000 C to about 2000 C depending on the desired properties or form of the SiC. In some embodiments the heating step takes place at about 5 C/min to reach the final temperature followed by holding at the desired temperature for about 1 to about 4 hours or longer followed by slowly cooling the impregnated carbon foam to room temperature. In some embodiments the final temperature is held for at least 1 hour.

By heating the mold containing the carbon foam and particulate silicone resin precursor to a temperature of about 1000 C to about 2000 C, a certain amount of the particulate silicone resin precursor, polysiloxane resin will react with the carbon in the siliconized carbon foam to form silicon carbide. In some embodiments, the resultant silicon carbide foam will have a yield of silicon carbide of from about 50% to about 99% silicon carbide based on the amount of silicon from the polysiloxane resin. In other embodiments, the silicon carbide yield may range from about 80% to about 99% and still further from about 85% to about 89%.

While several embodiments of the present invention have been shown and described, it will be obvious to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

What is claimed is:

1. A method for producing a siliconized carbon foam comprising the steps of:
    blending a predetermined amount of comminuted coal with a predetermined amount of particulate silicone resin to form a blended mixture;
    heating the blended mixture to a temperature sufficient to form a siliconized carbon foam wherein at least a portion of the silicon from the particulate silicone resin reacts with carbon to form silicon carbide in at least a portion of the siliconized carbon foam.

2. The method of claim 1, wherein the particulate silicone silicon resin is a polysiloxane resin comprising repeating units having the formula $[-Si(R)_2-O-]_n$ wherein R is one or more selected from the group consisting of hydrogen methyl, ethyl, propyl, isopropyl, butyl, isobutyl, and t-butyl, and wherein n ranges from about 10 to about 100.

3. The method of claim 2, wherein R on the repeating unit is methyl for at least 50% of the repeating units of the polysiloxane resin.

4. The method of claim 1, wherein the siliconized carbon foam exhibits a yield of silicon carbide from about 50% to about 99% silicon carbide based on the amount of silicon from the particulate silicone resin.

* * * * *